United States Patent [19]

Ogawa

[11] Patent Number: 5,612,387

[45] Date of Patent: Mar. 18, 1997

[54] NONLINEAR OPTICAL MATERIAL AND ITS METHOD OF MANUFACTURE

[75] Inventor: Kazufumi Ogawa, Osaka, Japan

[73] Assignee: Matsushita Electric Industrial Co., Ltd., Osaka, Japan

[21] Appl. No.: 455,979

[22] Filed: May 31, 1995

Related U.S. Application Data

[62] Division of Ser. No. 76,284, Jun. 11, 1993, Pat. No. 5,589,235, which is a continuation of Ser. No. 681,994, Apr. 8, 1991, abandoned.

[30] Foreign Application Priority Data

Apr. 13, 1990 [JP] Japan ................................ 2-98499

[51] Int. Cl.⁶ .............................. G02F 1/13; C08F 2/46
[52] U.S. Cl. .............................. 522/3; 522/173; 522/178; 522/181; 428/1; 349/186
[58] Field of Search .................................. 522/3, 2, 173, 522/178, 181; 359/103, 106; 428/1

[56] References Cited

U.S. PATENT DOCUMENTS

| | | | |
|---|---|---|---|
| 4,208,501 | 6/1980 | Yee et al. | 522/167 |
| 4,615,962 | 10/1986 | Garito | 430/20 |
| 4,759,614 | 7/1988 | Yokokura et al. | 350/350 S |
| 4,796,971 | 1/1989 | Robello et al. | 350/96.34 |
| 4,906,407 | 3/1990 | DeMartino et a. | 252/589 |
| 4,968,524 | 11/1990 | Ogawa et al. | 522/149 |
| 4,979,805 | 12/1990 | Yoshinaga et al. | 350/350 R |
| 5,028,109 | 7/1991 | Lawandy | 350/96.12 |
| 5,073,294 | 12/1991 | Shannon et al. | 252/299.01 |
| 5,112,881 | 5/1992 | Mandal et al. | 522/117 |
| 5,188,760 | 2/1993 | Hikmet et al. | 252/299.01 |
| 5,210,630 | 5/1993 | Heynderickx et al. | 359/106 |
| 5,218,074 | 6/1993 | Nordmann et al. | 528/96 |
| 5,374,371 | 12/1994 | Takeuchi et al. | 252/299.01 |

OTHER PUBLICATIONS

R. B. Meyer et al. "Ferroelectric Liquid Crystals,", J. Phys. (France) (1974), pp. 9, 10 & 11.

P. Keller, "Synthesis of New Ferroelectric Liquid Crustals", Ann. Phys. (1978) France, pp. 12–16.

Patrick Keller et al., "Synthese et mesomorphisme de quelques p–alkyloxybenzylidene, p–aminocinnamates de R–Chloro–2 propyle," C.R. Acad. Sc. Paris, Apr. 5, 1976, pp. 12–16.

"Structure and Physics of Ferroelectric Liquid Crystal," Corona, Inc. Tokyo, Japan, May, 15, 1990, pp. 229 to 233 and 263 to 266.

P. 1, "Structures of Azomethine, Azoxy and Ester Systems," and p. 2 Examples of Nematic Liquid Crystals Having an $R_3$ Group, (Source: Structure and Physics of Ferroelectric Liquid Crystals, Fukada et al., Corona, Inc. Tokyo, Japan).

*Primary Examiner*—Susan W. Berman
*Attorney, Agent, or Firm*—Ratner & Prestia

[57] ABSTRACT

A new nonlinear organic optical material having a high Second Harmonic Generation capability and a method of manufacturing the same is disclosed. Energy-beam sensitive monomer molecules having large molecular dipole-moments are sandwiched between two facing orientation films formed on respective substrates, and the energy-beam sensitive parts in said molecules are polymerized by irradiation with an energy-beam such as an X-ray beam after the dipole-moments of the energy-beam sensitive monomer molecules are aligned by applying a magnetic or an electric field. As a result of this, no cancellation of dipole-moments takes place, and polymers having extremely high dipole-moments and high Second Harmonic Generation efficiency can be derived and manufactured.

8 Claims, 3 Drawing Sheets

NONLINEAR OPTICAL MATERIAL AND ITS METHOD OF MANUFACTURE

CROSS-REFERENCE TO RELATED APPLICATION

This application is a division of Applicant's application Ser. No. 08/076,284, filed Jun. 11, 1993, now U.S. Pat. No. 5,589,235, which in turn was a file wrapper continuation of application Ser. No. 07/681,994, filed Apr. 8, 1991, now abandoned.

BACKGROUND OF THE INVENTION

1. Industrial Application

This invention is related to a new nonlinear optical material and its method of manufacture. This material may be employed to fabricate nonlinear optical devices, such as optical bistable devices, by utilizing its nonlinear optical effects.

2. Prior Art

A new optical material having improved nonlinear optical characteristics and higher responses is strongly desired at present. To attain the desired properties of such a material, organic compounds having D electron systems are well-suited. Such organic compounds are generally considered more advantageous than inorganic compound crystals, in which lattice vibration causes the nonlinear optical effects.

A method to prepare this kind of organic material is to introduce a strong donor-type substituent group and a strong acceptor-type substituent group into molecules having electron conjugates. However, with this method, the Second Harmonic Generation (SHG) effect essential to cause nonlinear optical effects, can hardly be obtained even if molecules having extremely high dipole-moments are prepared. Taking for example a dimolecule case, the reason for this is attributed to a strong tendency to form center-symmetrical crystals wherein the molecular dipole-moments are mutually cancelled because of strong interactions between dipole-moments themselves.

SUMMARY OF THE INVENTION

The object of the present invention is to solve the problem caused by the above mentioned dipole-moment cancellation effects caused in turn by the strong interaction of the molecular dipole-moments themselves. The present invention provides a new nonlinear optical material having a high Secondary Harmonic Generation (SHG) effect, and a method of manufacturing that material.

In accomplishing the above-described object of the invention, the new nonlinear optical material is prepared by polymerizing (or cross-linking) energy-beam sensitive functional monomer molecules having a high dipole-moment. This polymerization (or cross-linking) occurs while the dipole-moments of the monomer molecules are oriented in an identical direction, or aligned.

The nonlinear optical material of the present invention is manufactured by first confining energy-beam sensitive monomer molecules having a high dipole-moment between two facing orientation films formed and overlayed on two respective parallel substrates. Then, a magnetic field is applied in order to align the dipole-moments of the energy-beam sensitive molecules. While the energy-beam sensitive monomer molecules are aligned, a high-energy beam such as an X-ray beam is irradiated thereon in order to polymerize (or cross-link) the energy-beam sensitive part of the energy-beam sensitive monomer molecules.

EMBODIMENTS OF THE INVENTION

A few embodiments of the invention are now illustrated in the following by referring to the attached drawings in FIGS. 1, 2, 3, 4, and 5.

Figure 1:
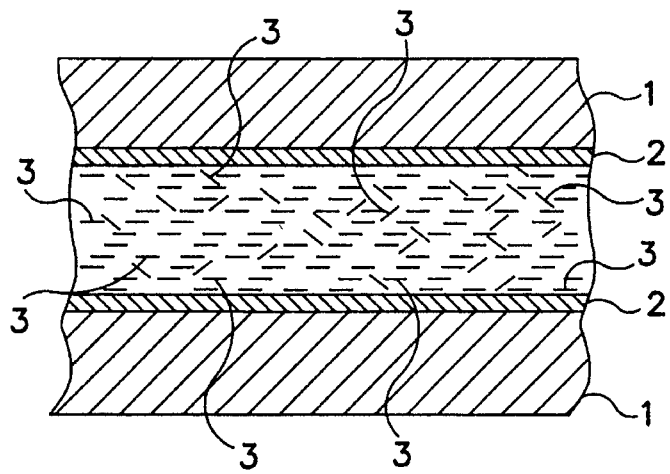
FIGS. 1, 2, and 3 are schematic cross-sections showing the manufacture of the nonlinear optical material of the present invention.

As shown in FIG. 1, an organic material such as polyimide is coated on a well-dried hydrophilic substrate 1 such as a glass or quartz plate to form an organic film thereon. This organic film is transformed into an orientation film 2 by rubbing its surface. A pair of substrates 1 with orientation films 2 thereon are disposed respectively to face each other.

If a pre-formed polyimide film is used (instead of coating), an organic film equivalent to orientation film 2 formed on substrate 1 can be obtained by rubbing directly on the surface of the preformed film before it is applied to substrate 1.

Figure 4:
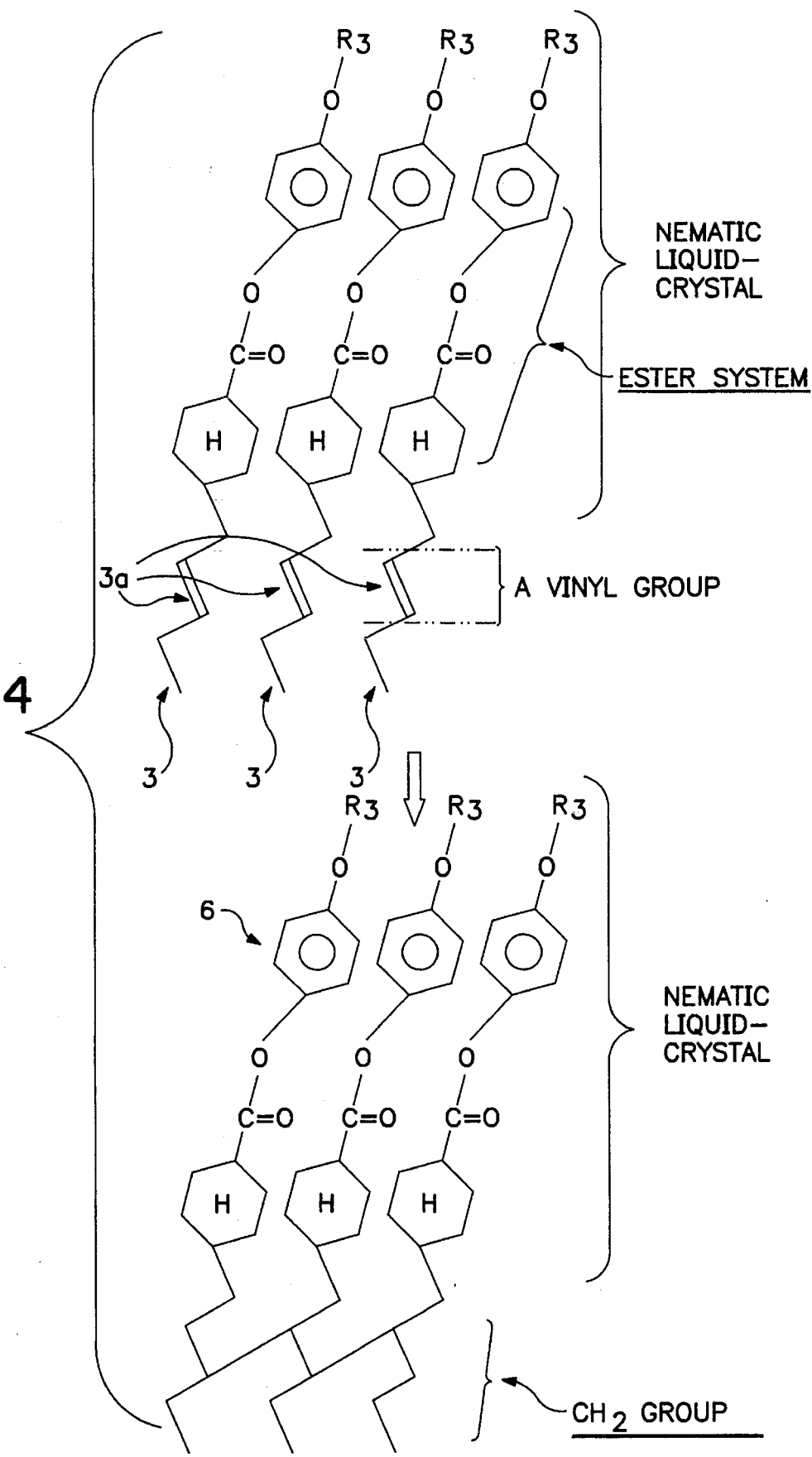
FIG. 4 shows a polymerization (or cross-linking) reaction which takes place in nematic liquid-crystal molecules as energy-beam sensitive monomer molecules are irradiated.
Figure 5:
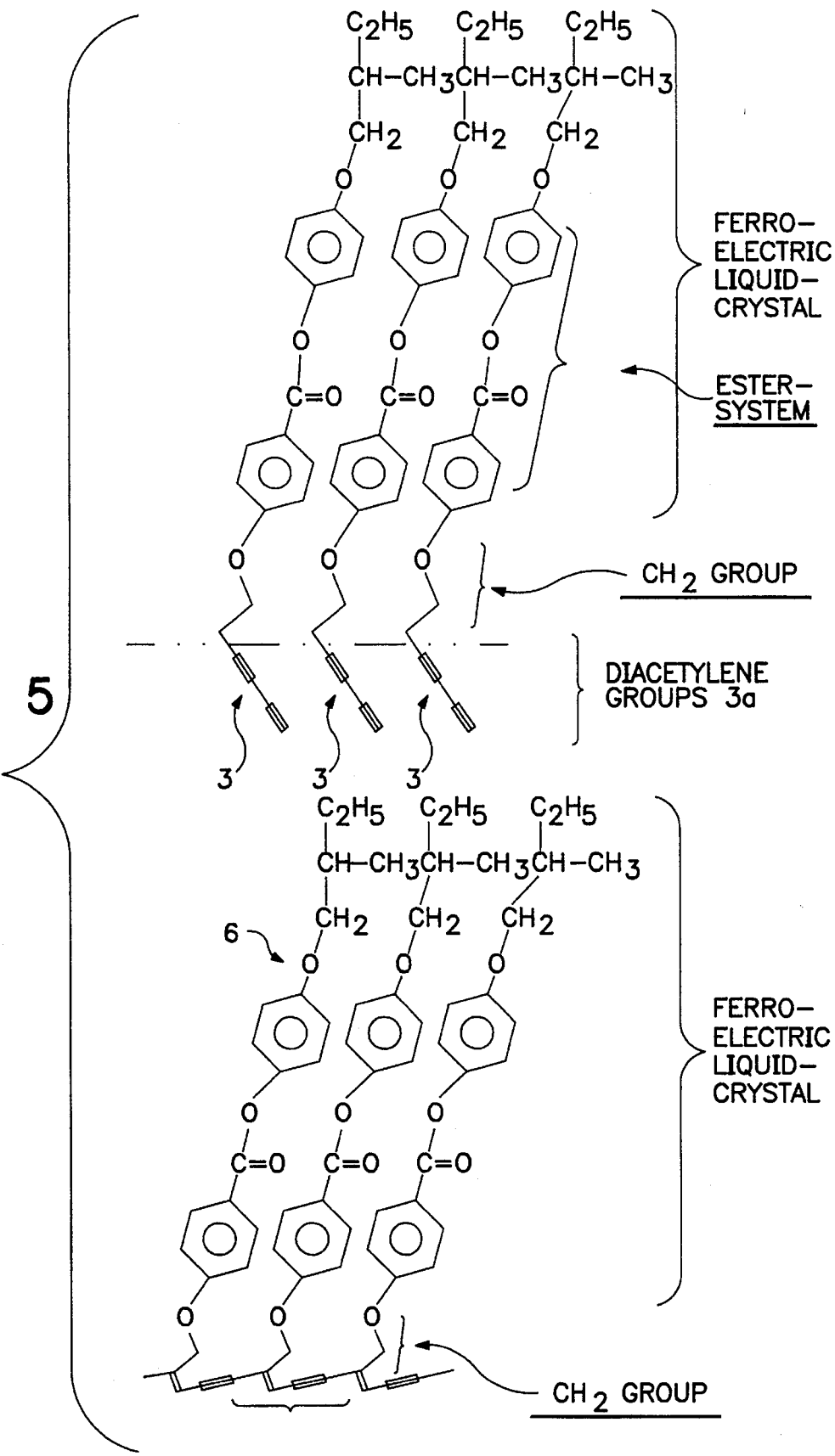
FIG. 5 shows a polymerization (or cross-linking) reaction which takes place in energy-beam sensitive monomer molecules which are derivatives of ferroelectric liquid crystal molecules.

Then, energy-beam sensitive monomer molecules 3 are introduced in a parallel gap formed between the pair of substrates 1, as shown in FIG. 1. Energy-beam sensitive monomer molecules 3, in which an energy-sensitive part 3a, such as an unsaturated carbon group as shown in FIGS. 4 and 5, is incorporated, have a large dipole-moment.

Figure 2:
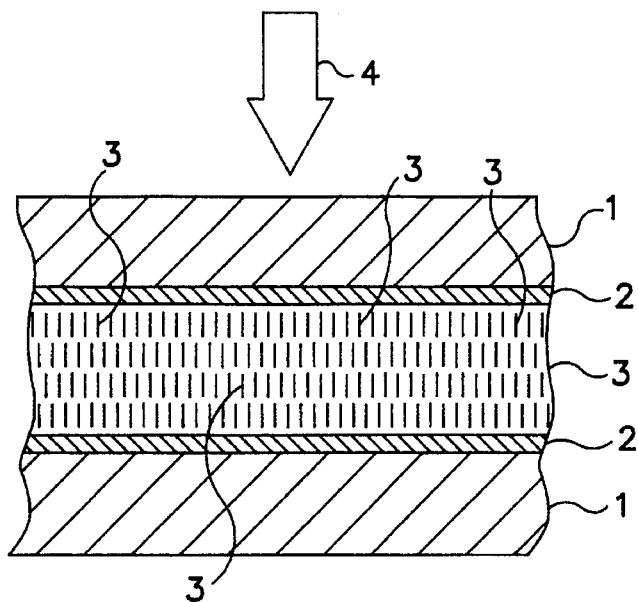

The orientation of dipole-moments of molecules 3 is in random directions immediately after the insertion of molecules 3 in said parallel gap as shown in FIG. 1. Then, the dipole-moments of molecules 3 are oriented in an aligned direction, as shown in FIG. 2 by the application of a magnetic field 4, having a magnetic field strength on the order of 10K gauss.

In this process, the orientation angle of monomer molecules 3 can be aligned in any desired direction by controlling the direction of applied magnetic field 4.

Instead of using a magnetic field to align the dipole-moments, an electric field may be used to accomplish this alignment. When use of an electric field is desired, an electrode, such as an ITO (Indium Tin Oxide) electrode, is formed between substrate 1 and orientation film 2. Then, an electric field having a field strength of an order of $10^6$ V/cm is applied by the electrode to energy-beam sensitive molecules 3.

Figure 3:
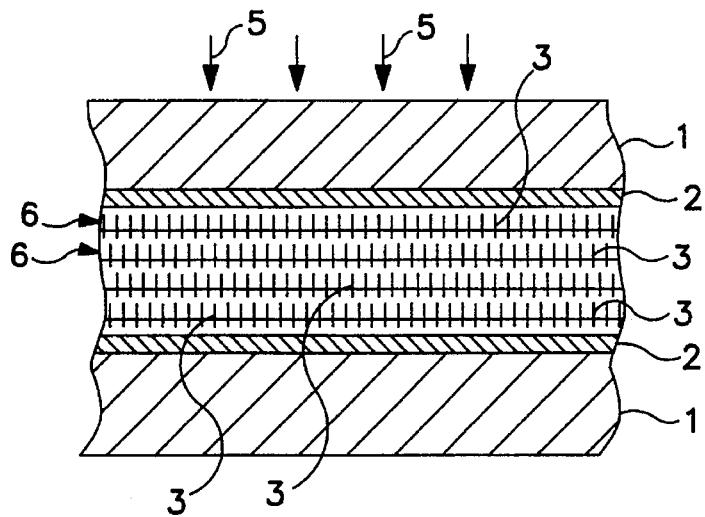

Then, as shown in FIG. 3, the aligned energy-sensitive molecules 3 are irradiated by an energy-beam 5 such as X-ray, gamma-ray, electron-beam, ion-beam, or ultraviolet ray irradiation Energy-beam 5 is irradiated in an amount of 10 to 100M rad for polymerizing (or cross linking) said energy-beam sensitive part 3a incorporated in said molecules 3 to yield a polymerized (or cross linked) polymer 6.

By accomplishing the above processes, all energy-sensitive monomer molecules 3 of polymerized polymer 6 having a large dipole-moment can be oriented in one direction. Since polymer 6 is polymerized at a state where the dipole-moments of monomer molecules 3 are aligned and fixed in one direction, polymer 6 is capable of showing highly efficient Second Harmonic Generation (SHG) effects.

Furthermore, energy-beam sensitive monomer molecules 3 may be a derivative of a liquid-crystal molecule. For example, nematic liquid-crystal molecules, in which a vinyl group (—C=C—) is incorporated (via —CH$_2$— groups) as energy-sensitive monomer molecules, may be employed. The monomer molecules 3 can be cross-linked and fixed by X-ray irradiation applied while the orientation of molecules 3 are aligned under an applied magnetic field, as shown in FIG. 4.

The same effect as discussed above can be obtained also when acetylene groups (—C b C—), instead of vinyl groups, are incorporated in said monomer molecules 3 as energy-sensitive part 3a.

Moreover, as shown in FIG. 5, the energy-beam sensitive molecules may be ferroelectric liquid-crystal molecules of the azomethine, azoxy, or, ester systems, in which diacetylene groups (—C ⁻b C—C b C—) are incorporated via —CH$_2$— groups. Polymerization (or cross-linking) of said monomers proceeds by a reaction in which the diacetylene groups form polydiacetylene bonds.

Therefore, each monomer molecule 3 can be cross-linked and fixed in a state where its orientation is fixed by an application of a magnetic field and an irradiation by ultraviolet rays. Furthermore, since the polymerizing reaction in such diacetylene derivative proceeds topochemically, no internal stress is produced in said polymerized polymer 6.

Since said polymer 6 is a derivative of a ferroelectric liquid crystal molecule, its dipole-moment is very large, and thus, a highly efficient SHG active material can be obtained by using the material and manufacturing method specified here.

What is claimed:

1. A method of manufacturing a nonlinear optical material comprising:

forming an organic orientation film on a surface of each of two substrates;

positioning said substrates in a spaced apart relationship with said organic orientation films in a face to face relationship to establish a gap therebetween;

introducing energy-beam sensitive monomer molecules which are derivatives of a ferroelectric liquid crystal and having a large dipole moment which results in orientation in an aligned direction when exposed to a magnetic field into said gap, said energy-beam sensitive monomer molecules having energy-beam sensitive parts comprising diacetylene groups bonded via CH$_2$ groups;

applying a magnetic field in order to align the directions of said dipole-moments, and irradiating said monomer molecules having aligned dipole-moments with an energy-beam in order to polymerize the energy-beam sensitive parts of said monomer molecules.

2. A method of manufacturing a nonlinear optical material as recited in claim 1, wherein said energy-beam is selected form the group consisting of X-ray, gamma ray, electron beam, ion beam, and ultraviolet raybeams.

3. A method of manufacturing a nonlinear optical material as recited in claim 1, wherein said ferroelectric liquid crystal molecules are selected from the group consisting of azomethine, azoxy, and ester compounds.

4. A method of manufacturing a nonlinear optical material comprising:

forming an organic orientation film overlying an electrode on a surface of each of two substrates;

positioning said substrates in a spaced apart relationship with said organic orientation films in a face to face relationship to establish a gap therebetween;

introducing energy-beam sensitive monomer molecules which are derivatives of a ferroelectric liquid crystal and having a large dipole moment which results in orientation in an aligned direction when exposed to an electric field into said gap, said energy-beam sensitive monomer molecules having energy-beam sensitive parts comprising diacetylene groups bonded via CH$_2$ groups;

applying an electric field between said electrodes in order to align the directions of said dipole-moments, and irradiating said monomer molecules having aligned dipole-moments with an energy-beam in order to polymerize said energy-beam sensitive parts in said monomer molecules.

5. A method of manufacturing a nonlinear optical material as recited in claim 4, wherein said energy-beam is selected from the group consisting of X-ray, gamma ray, electron beam, ion beam, and ultraviolet raybeams.

6. A method of manufacturing a nonlinear optical material as recited in claim 4, wherein said ferroelectric liquid crystal molecules are selected from the group consisting of azomethine, azoxy, and ester compounds.

7. A method of manufacturing a nonlinear optical material comprising:

providing at least two substrates comprising a material selected from the group consisting of a hydrophilic glass and quartz;

forming polyimide coatings on a surface of each of said at least two substrates;

orienting said polyimide coatings by rubbing to form orientation films on said coated surfaces;

positioning said substrates in a spaced apart relationship with said orientation films in a face to face relationship to establish a gap therebetween;

introducing into said gap energy-beam sensitive monomer molecules which comprise
      derivatives of a ferroelectric liquid crystal having a large dipole moment, said derivatives selected from the group consisting of azomethine, azoxy, and ester compounds, and
      an energy-beam sensitive part bonded to said derivatives via CH$_2$ groups, said energy beam sensitive part comprising a diacetylene group;

applying a magnetic field in order to align the directions of said dipole-moments, and irradiating said monomer molecules having aligned dipole-moments with an energy-beam in order to polymerize the energy-beam sensitive parts of said monomer molecules.

8. A method of manufacturing a nonlinear optical material comprising:

providing at least two substrates comprising a material selected from the group consisting of a hydrophilic glass and quartz, said substrates having an electrode on a surface of each of said at least two substrates;

forming polyimide coatings overlying said electrodes on said surface of each of said substrates;

orienting said polyimide coatings by rubbing to form orientation films on said coated surfaces;

positioning said substrates in a spaced apart relationship with said orientation films in a face to face relationship to establish a gap therebetween;

introducing into said gap energy-beam sensitive monomer molecules which comprise derivatives of a ferroelectric liquid crystal having a large dipole moment, said derivatives selected from the group consisting of azomethine, azoxy, and ester compounds, and an energy-beam sensitive part bonded to said derivatives via $CH_2$ groups, said energy beam sensitive part comprising a diacetylene group;

applying an electric field in order to align the directions of said dipole-moments, and irradiating said monomer molecules having aligned dipole-moments with an energy-beam in order to polymerize the energy-beam sensitive parts of said monomer molecules.

* * * * *

UNITED STATES PATENT AND TRADE MARK OFFICE
CERTIFICATE OF CORRECTION

PATENT NO.   : 5,612,387
DATED        : March 18, 1997
INVENTOR(S)  : Ogawa

It is certified that error appears in the above-identified patent and that said Letters Patent is hereby corrected as shown below:

On the cover page, item [56] References Cited, Other Publications, in the P. Keller reference delete "Crustals" and insert therefor --Crystals--.

Column 3, line 64, delete "form" and insert therefor --from--.

Signed and Sealed this

Twelfth Day of August, 1997

Attest:

BRUCE LEHMAN

Attesting Officer

Commissioner of Patents and Trademarks